L. GILES.
DUSTING MACHINE.
APPLICATION FILED NOV. 14, 1921.
1,435,706.
Patented Nov. 14, 1922.
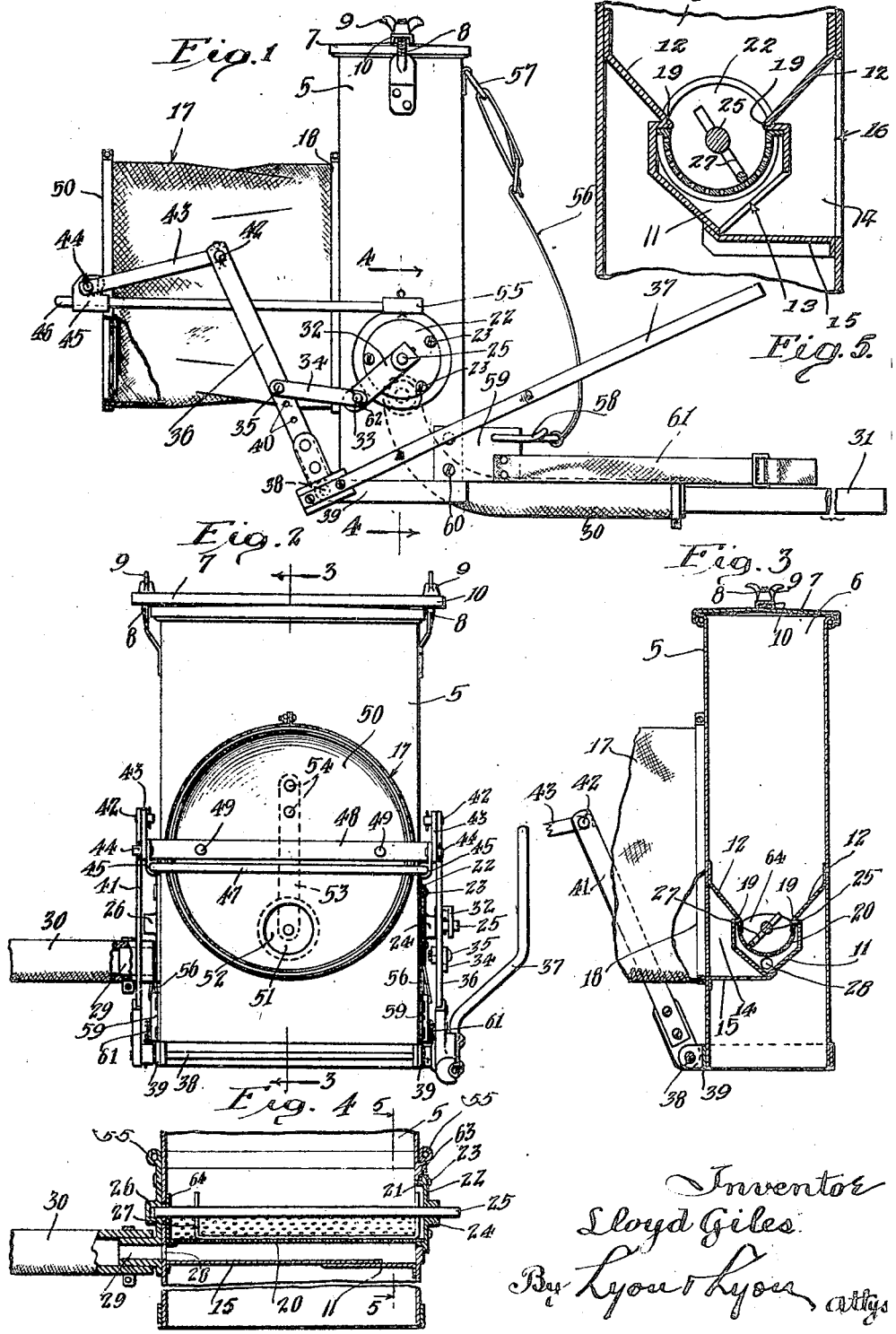
Inventor
Lloyd Giles.
By Lyon & Lyon
attys Patented Nov. 14, 1922.

1,435,706

UNITED STATES PATENT OFFICE.

LLOYD GILES, OF LOS ANGELES, CALIFORNIA, ASSIGNOR TO WALNUT GROWERS SPRAY MANUFACTURING COMPANY, OF LOS ANGELES, CALIFORNIA, A CORPORATION OF CALIFORNIA.

DUSTING MACHINE.

Application filed November 14, 1921. Serial No. 514,948.

*To all whom it may concern:*

Be it known that I, LLOYD GILES, a citizen of the United States, residing at Los Angeles, in the county of Los Angeles and State of California, have invented a new and useful Dusting Machine, of which the following is a specification.

This invention relates to machines of the character employed in discharging an insecticide powder upon plants and trees for the purpose of destroying the insects.

An object of the invention is to produce a machine of this character which can be carried on the back of the operator and readily operated by him for discharging the insecticide.

Another object is to provide a simple and effective mechanism for simultaneously operating the bellows and the powder feed member.

Another object is to construct the feed so that it can be readily removed as a unit from the chamber, in which it is mounted, for cleansing or repair.

The accompanying drawings illustrate the invention.

Fig. 1 is a side elevation of a dusting machine constructed in accordance with the provisions of this invention, a portion of the nozzle being broken away to contract the view and the bellows being shown partly in section.

Fig. 2 is an elevation from the left of Figure 1.

Fig. 3 is a fragmental elevation mainly in vertical section on line indicated by 3—3 Fig. 2.

Fig. 4 is a fragmental vertical section on line indicated by 4—4 Fig. 1.

Fig. 5 is an enlarged sectional elevation on the line indicated by 5—5, Fig. 4.

In the drawings a receptacle is indicated at 5 for holding an insecticide powder. The top of the receptacle 5 is open, as indicated at 6, to admit the powder to the receptacle, and said opening is closed by a cover 7 detachably held in place by threaded studs 8 projecting upwardly from the sides of the receptacle, wing nuts 9 on said studs and a bar 10 extending transversely of the receptacle. The studs 8 project through the bar 10 and the wing nuts 9 bear upon the upper face of said bar.

The bottom of the receptacle 5 constitutes a trough 11 extending transversely of the receptacle from side to side thereof. The marginal portions of the trough 11 extend aslant upwardly and outwardly, as indicated at 12, and are attached, respectively, to the front and rear walls of the receptacle. The walls of the receptacle 5 extend below the level of the trough 11 and an opening 13 is provided in the lower portion of the trough near one end thereof. This opening communicates with an air passage 14, the roof of which is formed by one of the slanting trough portions 12. The floor of the air passage 14 is formed by a plate 15 which connects with the bottom of the trough below the opening 13 and with the rear wall of the receptacle 5 just beneath a port 16 in the rear wall of the receptacle. The plate 15 is attached at its ends to the side walls of the receptacle. The port 16 affords communication between the air passage 14 and a horizontal bellows 17 which is secured to a rearwardly extending flange 18 on the rear wall of the receptacle 5. The slanting portions 12 terminate at their lower ends in shoulders 19, which overhang and substantially engage the longitudinal margins of a semicircular screen 20 secured at one end by solder, not shown, or other suitable means to the inwardly projecting flange 21 of a circular plate 22 that is detachably secured by screws 23 or other fastening devices in position to close an opening 63 in one side of the receptacle 5. The overhanging shoulders 19 are of advantage for contact with the longitudinal margins of the screen, for the reason that if the shoulders were beneath the screen edges, replacement of the screen, after it has been removed, would be more difficult because of the insecticide lying upon the shoulders. The screen 20 is thus positioned in the trough and is spaced from the walls of the trough. The screen is closed at the end opposite to the plate 22 by a plate 64.

The plate 22 is provided with a bearing 24 for a rock shaft 25 which is also journaled in another bearing 26 on the opposite side of the receptacle. The rock shaft 25 is provided with a U-shaped scraper 27 which engages the screen 20 so that oscillatory movement of the shaft 25 will rock the scraper 27 back and forth upon the inner face of the screen and thus sift the insect powder through the screen into the trough 11. The powder thus discharged into the trough 11 may be blown through a port 28 in one of the side walls of the receptacle, said port 28 being at the opposite end of the trough from the opening 13. Alined with the port 28 is a nipple 29 upon which is secured one end of a hose or tube 30 that provides a flexible connection between the nipple 29 and a nozzle 31.

The rock shaft 25 projects through the bearing 24 and is provided on its projecting end with a crank arm 32 which is pivoted at 33 to a link 34 that in turn is pivoted at 35 to the arm 36 of a bell crank lever, the other arm of said bell crank lever being indicated at 37. The bell crank lever is pivoted at 38 to a bracket 39 attached to the receptacle 5. The pivot 35 may be selectively positioned in anyone of a series of holes 40 in the crank arm 36. The bell crank lever is positioned at one side of the receptacle 5 and the crank arm 37 extends forwardly so that it may be readily grasped by the right hand of the operator when the receptacle is in place on his back.

The pivot 38 is a shaft extending transversely of the receptacle 5 and the lever arm 36 is secured to said shaft. Also secured to the shaft 38 adjacent the other side of the receptacle is an arm 41 corresponding to the arm 36. The upper ends of the arms 36, 41 are pivoted at 42 to links 43, respectively. The links 43 are pivoted at 44 to slides 45 which are shiftably mounted on horizontal guides 46. The rear ends of the guides 46 are connected by a cross piece 47 and the cross piece and guides together form a U-shaped member which embraces the bellows. The slides 45 are connected by a cross bar 48 secured by rivets 49, or other fastening devices, to the rear head 50 of the bellows 17. The bellows head 50 is provided with an inlet port 51 controlled by a flap valve 52 which is mounted on one end of a spring 53 secured by rivets 54 to the inner face of the head 50. The forward ends of the guides 46 are mounted in supporting members 55 on the opposite sides of the receptacle 5.

Shoulder straps 56, only one of which can be seen because of the nature of the views, are provided to attach the receptacle to the operator. The upper ends of the straps 56 are secured by eyes 57 to the upper portion of the front wall of the receptacle, and the lower ends of the straps 56 are connected by eyes 58 to plates 59 secured by screws 60 to the side walls of the receptacle near the lower ends of said walls. A waist strap 61 is also provided and is secured at its opposite ends to the plates 59. The plates 59 are spaced sufficiently to permit the body of the operator to be interposed between them, so that the front wall of the receptacle rests against his back. The front wall is flat and therefore the receptacle cannot roll from side to side of the operator's back as would be possible if the receptacle were cylindrical.

To use the invention the operator will place it on his back in an obvious manner to position the lever arm 37 at his right side. He will grasp the lever 37 with his right hand and the nozzle 31 with his left hand. To discharge the insecticide from the machine, the operator will swing the arm 37 up and down to effect a rocking motion of the arms 36, 41. Through motion of the arms 36, 41, the scraper 27 will be operated to feed the insecticide through the screen 20 into the trough 11, and the slides 45 will be reciprocated on the guides 46, thus alternatively compressing and expanding the bellows 17. On the compression stroke of the bellows the valve 52 will close and the confined air will be discharged through the port 16, air passage 14 and opening 13 into the trough 11. The air passing along the trough 11 will become laden with dust particles and will discharge through the port 28, nipple 29 and hose 30 into the nozzle 31 and will be forced from said nozzle by action of the bellows.

I am aware that it is not new to employ a screen and scraper therefor, a trough to receive the sifted dust from the screen and a bellows to force the sifted dust out of the machine, but, as has been carefully pointed out, I have provided certain improvements which produce reliable action of the bellows and facilitate dismounting of the screen, rocker shaft and scraper so that these parts can be readily cleaned, as is sometimes necessary.

By the provision of the guides 46 and slides 45, the rear head of the bellows is kept in perfect alinement with the front end thereof while it is being operated, thus avoiding such wear as would be induced by shifting of said head laterally with respect to the longitudinal axis of the bellows.

To remove the screen 20 for cleaning, the screws 23 will be loosened, the cotter pin 62 will be removed from the pivot 33 and the crank 32 and link 34 will be disconnected. The operator will then grasp the crank 32 and draw the plate 22 outwardly, thus carrying with it the screen, the shaft and the scraper. To insert the screen a reversal of the operations just described will be performed.

The higher the link 34 is adjusted along the lever arm 36, the longer will be the stroke of the scraper 27 and, consequently, the larger the amount of dust sifted with each stroke of the scraper.

I claim:

1. In a dusting machine, the combination of a receptacle having an opening in one side, a closure for the opening detachably fastened to the receptacle, a screen attached at one end to the closure, a scraper for the screen, the bottom of the receptacle forming a trough extending beneath the screen and having an air inlet near one end, there being an air outlet in the receptacle at the other end of the trough, means to supply a current of air to the air inlet, and mechanism for operating the scraper and air-supply means.

2. In a dusting machine, the combination of a receptacle having an opening in one side, a closure for the opening detachably fastened to the receptacle, a screen attached at one end to the closure, a scraper for the screen, the bottom of the receptacle forming a trough extending beneath the screen and having an air inlet near one end, there being an air outlet in the receptacle at the other end of the trough, shoulders on the trough overhanging the longitudinal edges of the screen, means to supply a current of air to the air inlet, and mechanism for operating the scraper and air-supply means.

3. In a dusting machine, the combination of a receptacle having an opening in one side, a closure for the opening detachably fastened to the receptacle, the bottom of the receptacle forming a trough having one of its ends adjacent said opening, there being an air outlet in the receptacle at the other end of the trough, the upper portions of the trough extending aslant upwardly and outwardly and terminating at their lower ends in overhanging shoulders, a semi-cylindrical screen in the trough removable through the opening and having its longitudinal edges extending beneath the shoulders, means to force a powder downwardly through the screen, and means to blow air into the trough.

4. In a dusting machine, the combination of a receptacle having an opening in one side, a closure for the opening detachably fastened to the receptacle, the bottom of the receptacle forming upwardly and outwardly slanting portions terminating at their lower ends in overhanging shoulders, a screen removable through the opening having its longitudinal edges extending beneath the shoulders, there being an air outlet in the receptacle beneath the level of the screen, means to force a powder downwardly through the screen, and means to blow air beneath the screen.

5. In a dusting machine, the combination of a receptacle having an opening in one side, a closure for the opening detachably fastened to the receptacle, a detachable screen in the receptacle removable through said opening, there being an air outlet in the receptacle beneath the level of the screen, means to force a powder downwardly through the screen, and means to blow air beneath the screen.

Signed at Los Angeles, California, this 8th day of November, 1921.

LLOYD GILES.

Witnesses:
GEORGE H. HILES,
JAS. L. GILBERT.